United States Patent [19]

Frentzel et al.

[11] Patent Number: 4,817,991
[45] Date of Patent: Apr. 4, 1989

[54] SAFETY FITTING FOR A VACUUM ORIFICE IN A SWIMMING POOL

[75] Inventors: Herman E. Frentzel, Kentfield; Deiter Rief, Rohnert Park, both of Calif.

[73] Assignee: Arneson Products, Inc., Corte Madera, Calif.

[21] Appl. No.: 64,241

[22] Filed: Jun. 19, 1987

[51] Int. Cl.[4] .............................................. F16L 5/00
[52] U.S. Cl. ........................................ 285/7; 285/317; 285/901; 220/284; 137/359
[58] Field of Search ................. 285/7, 189, 317, 318, 285/901, 903, 39; 138/89, 89.1; 4/490, 507, 509, 293, 504, 488; 137/356, 359; 220/284, 285, 286

[56] References Cited

U.S. PATENT DOCUMENTS

| 794,082 | 7/1905 | Crone | 285/901 X |
|---|---|---|---|
| 981,706 | 1/1911 | Spencer | 137/359 |
| 1,029,405 | 6/1912 | Smith | 220/285 |
| 1,096,278 | 5/1914 | Sutton | 285/901 X |
| 1,450,857 | 4/1923 | Johnson | 285/901 X |
| 1,483,953 | 2/1924 | Rainey | 285/901 X |
| 1,678,946 | 7/1928 | Joyce | 285/901 |
| 1,681,470 | 8/1928 | Drees | 285/901 X |
| 1,741,111 | 12/1929 | Hines | 138/89 |
| 2,451,405 | 10/1948 | Oakes | 138/89 |
| 2,851,286 | 9/1958 | Bishop | 137/359 |
| 4,300,597 | 11/1981 | Delay, Sr. | 138/89 |
| 4,542,922 | 9/1985 | Grossauer | 285/903 X |
| 4,676,392 | 6/1987 | Giggard et al. | 220/284 |
| 4,678,097 | 7/1987 | Crute | 138/89 X |

*Primary Examiner*—Randolph A. Reese
*Assistant Examiner*—Anthony Knight
*Attorney, Agent, or Firm*—Limbach, Limbach & Sutton

[57] ABSTRACT

A fitting is disclosed for covering the vacuum orifice formed in the wall of the swimming pool. The fitting includes a hollow body member connectable to the vacuum orifice and having an opening for receiving a vacuum hose. A spring loaded cap is connected to the body member and is designed to seal the orifice when the cap is in the closed position. A safety locking mechanism is provided to prevent the inadvertent opening of the fitting. In the preferred embodiment, the cap further includes a lug for engaging a vacuum hose to enhance the connection between the hose and the fitting.

5 Claims, 1 Drawing Sheet

SAFETY FITTING FOR A VACUUM ORIFICE IN A SWIMMING POOL

TECHNICAL FIELD

A fitting is disclosed for covering the vacuum orifice formed in the wall of a swimming pool. The fitting is provided with a safety lock to prevent potential injury.

BACKGROUND OF THE INVENTION

One of the more time consuming chores facing a pool owner is vacuuming a pool. Most below ground pools are provided with surface skimmers which remove a significant portion of leaves and debris that float on the surface of the water in the pool. Unfortunately, any debris which sinks to the bottom of the pool must be removed by some form of vacuuming operation.

To aid the pool owner in carrying out this task, a number of automatic devices have been developed for vacuuming the pool. One such device is marketed by Aquanaut, Inc., under the trademark Pool Vac. Other such automatic devices are manufactured under the trademarks Kreepy Krauly and Baracuda. All of these automatic devices are powered by a vacuum source, supplied through a vacuum hose. When these devices were first introduced, the vacuum hose was typically connected to the inlet within the skimmer. The drawback to this arrangement is that the skimmer is then disabled and surface debris is not collected.

Recognizing this problem, pool builders are now installing separate vacuum orifices into the side walls of the pools. These orifices are specifically designed to receive the end of the vacuum hose from the cleaner. The orifice, which is located below the water level, is in communication with the filter pump which creates a vacuum sufficient to power the pool cleaner.

When the pool cleaner is not in use, and the vacuum hose is disconnected from the orifice, the suction to the orifice can be sealed off by a valve. Disabling the exposed orifice is extremely important for safety reasons. In a typical system, the suction at the orifice can be up to 15 pounds per square inch. This suction is strong enough to hold the hand of a small child who might have playfully covered the orifice. Long hair can also be easily sucked into the orifice, trapping a swimmer below the water. In either case, the potential for drowning exists. Accordingly, it would be desirable to provide a safety backup in case the pool owner forgets to shut off the valve.

The safety problems discussed above can also be encountered when the suction hose becomes inadvertently dislodged from the vacuum orifice. When turning of a suction pump, compressed air in the filter system can create a backward surge of water that is sufficient to dislodge the hose and expose the orifice. Of course, the hose could also be inadvertently dislodged from the orifice by a swimmer. Accordingly, it would be desirable to provide a mechanism which inhibits the inadvertent release of the hose from the vacuum orifice.

Accordingly, it is an object of the subject invention to provide a new and improved safety fitting for covering the vacuum orifice of the swimming pool.

It is another object of the subject invention to provide a new and improved safety fitting for covering the vacuum orifice of a swimming pool which includes a locking mechanism to prevent the improper opening of the fitting.

It is a further object of the subject invention to provide a new and improved fitting for covering the vacuum orifice which includes a spring means for snapping a cap back into the locked position after the vacuum hose is removed.

It is still a further object of the subject invention to provide a new and improved fitting for covering a vacuum orifice wherein the locking mechanism can not be opened when the suction pump is operating.

It is still another object of the subject invention to provide a new and improved fitting for covering a vacuum orifice wherein the locking mechanism is extremely difficult to open without a separate tool even when the suction pump is not operating.

It is still a further object of the subject invention to provide a new and improved fitting for covering a vacuum orifice which includes a safety lug for holding a vacuum hose in the fitting during a reverse surge of water from the pump.

SUMMARY OF THE INVENTION

In accordance with these and many other objects, the subject invention provides for a fitting connectable to the vacuum orifice formed in the wall of the swimming pool. The fitting is designed to receive one end of a vacuum hose, the other end of which is connected to an automatic pool cleaner. The fitting includes a hollow body member connectable to the vacuum orifice. In the preferred embodiment, the body member is threaded and is engageable with the vacuum orifice of the pool. The fitting also includes a cap configured to seal the orifice when it is in a closed position. A spring biasing means is provided to urge the cap into the closed position. The cap is maintained in the closed position by a locking mechanism defined by the engagement between a resilient finger formed on the cap and a lip formed in the body member. In the preferred embodiment, the cap includes a lug to engage the hose against reverse surges of pressure.

Further objects and advantages will become apparent from the following detailed description taken in conjunction with the drawings in which:

DETAILED DESCRIPTION OF THE PREFERRED EMBODIMENT

Figure 1:
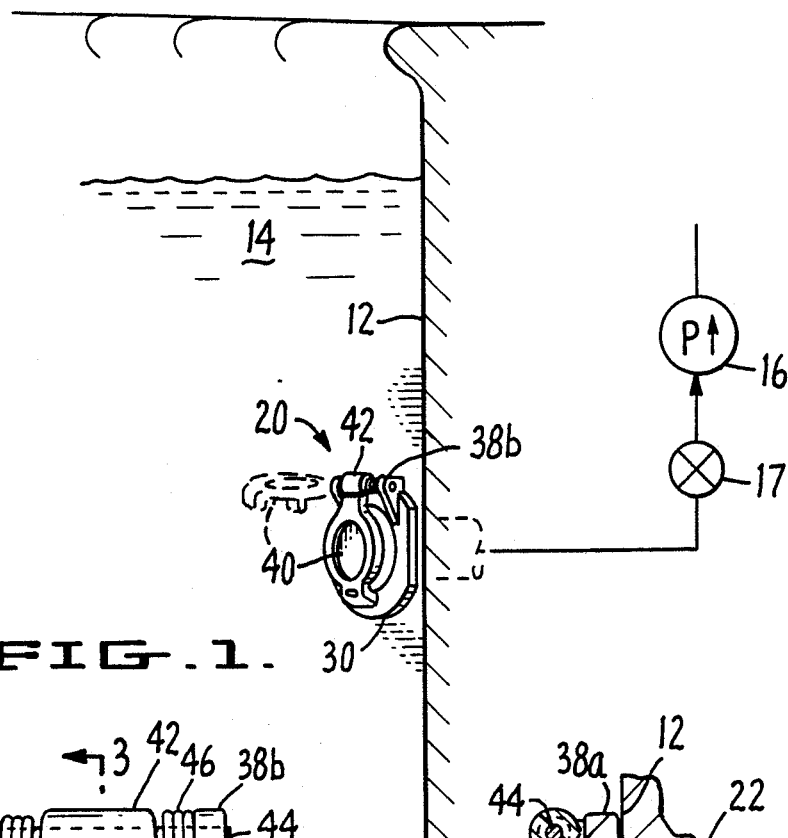
FIG. 1 is a prospective view of the fitting of the subject invention shown mounted in the vacuum orifice of a swimming pool.

Referring to the figures, the fitting 20 of the subject invention is shown mounted in a vacuum orifice 10 formed in the wall 12 of a swimming pool. The vacuum orifice 10 is located below the surface of the water 14. The vacuum orifice is in communication with the pump 16 of the filtration system of the pool. A valve 17 is typically provided to shut off suction between the pump 16 and the orifice 10. The fitting 20 of the subject invention is used for added safety in the event that the vacuum hose 18 is not connected to the orifice while suction is present.

The fitting 20 includes a hollow body member 22 having an opening 24 for receiving the vacuum hose 18. The body member includes a threaded cylindrical portion which is receivable in the threaded orifice 10. The body member 22 further includes an annular flange 30 which mounts flush against the wall 12 of the pool. Flange 30 can include a threaded aperture 32 for receiving a sharpened screw 34. The screw 34 can be tightened against the surface of the wall 12 to prevent unwanted rotation of the fitting after it installed. The annular flange 30 also includes a pair of projecting supports 38a and 38b shown best in FIG. 2. Supports 38 are used for the mounting of the cap 40.

Figure 2:
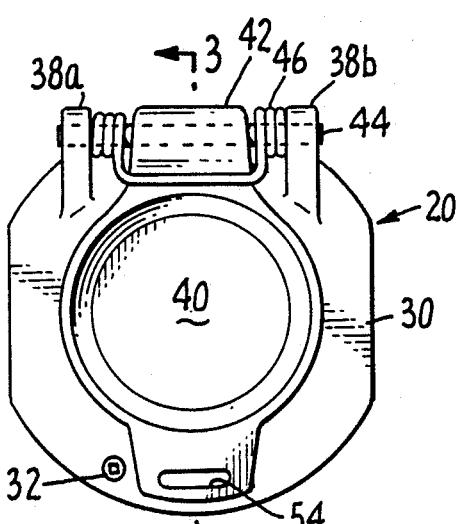
FIG. 2 is a front elevational view of the fitting of the subject invention.
Figure 3:
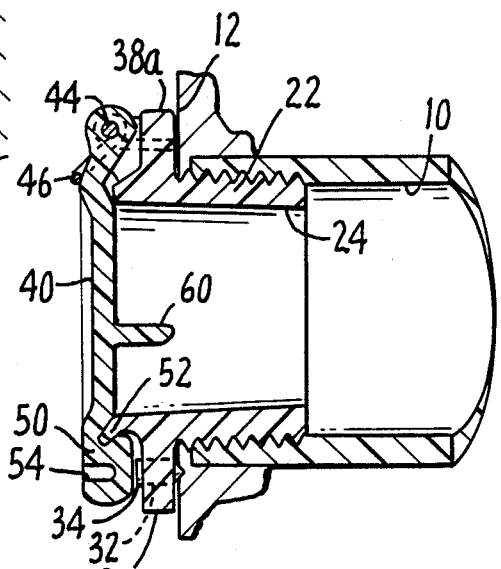
FIG. 3 is a cross-sectional view taken along the line 3—3 in FIG. 2 of the fitting of the subject invention showing the cap in the closed position.

As shown in FIGS. 2 and 3, cap 40 is configured to cover and seal the opening 24 when it is in the closed position. The upper end of the cap 40 includes a flange 42 through which a rod 44 is passed. The rod 44 is engageable in the projecting supports 38 formed on the flange 30 of the body member 22. As illustrated in FIG. 2, a spring 46 is wrapped around the pin 44 and engages the cap 40. The spring is intended to bias the cap into the closed position.

In accordance with the subject invention, the fitting includes a safety lock to prevent the inadvertent opening of the cap. This safety lock is defined by a resilient finger 50 which is formed on the cap and which engages a projecting lip 52 on the body member. As the finger becomes engaged with the lip, it is biased slightly into and over the lip. It is intended that this engagement be quite firm and quite difficult to open by hand even with the pump turned off. In practice, it is necessary to insert a tool, such as a screwdriver, between the finger 50 and flange 30 to release the cap. When the pump is operating, it is extremely difficult to open the cap even with a tool. In another aspect of the subject invention, the force of the spring 46 is designed to have sufficient strength such that when the vacuum hose is removed, the cap will snap back in a manner to engage the finger 50 with the lip 52, even in the absence of suction at the orifice. Finger 50 is preferably formed with a recess 54 to facilitate fabrication by an injection molding technique.

Figure 4:
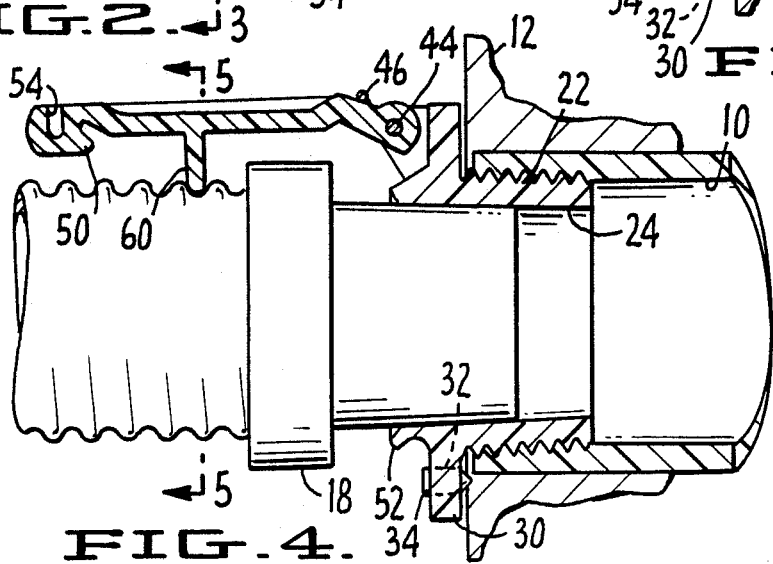
FIG. 4 is a cross-sectional view, similar to FIG. 3, illustrating the cap in the open position and with the vacuum hose received in the fitting.
Figure 5:
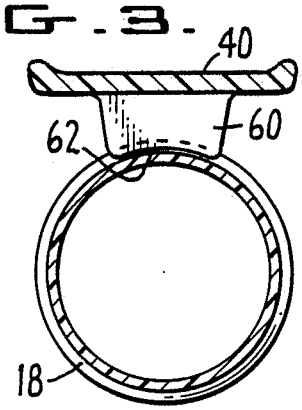
FIG. 5 is a partial cross-sectional view taken along line 5—5 in FIG. 4, illustrating the lug formed in the cap of the fitting of the subject invention.

In accordance with the subject invention, cap 40 is further provided with a tapered, projecting lug 60. The free end of the lug 60 has an arcuate configuration 62. When the cap is in the closed position the lug projects inwardly within the fitting as shown in FIG. 3. When the cap is in the open position as shown in FIG. 4, the arcuate surface 62 of lug 60 engages with the corrugations of vacuum hose 18. The force of the spring 46 insures a tight engagement thereby inhibiting dislodgement of the hose due to a reverse surge of water.

While the subject invention has been described with reference to a preferred embodiment, various changes and modifications could be made therein by one skilled in the art without varying from the scope and spirit of the subject invention as defined by the appended claims.

We claim:

1. A fitting for a vacuum orifice formed in the wall of a swimming pool, said fitting for receiving the end of a vacuum hose, said fitting comprising:

a hollow body member connectable to said vacuum orifice and having an opening for receiving a vacuum hose;

a cap connected to said body member and configured to cover and seal the opening in said body member when said cap is in a closed position;

spring means for biasing said cap into said closed position; and lock means for securing said cap in the closed position, said lock means being defined by a downwardly projecting lip formed on the exterior of said body member and a resilient finger formed on said cap, said lock means being configured such that in the closed position a gap is defined for receiving a tool to facilitate the disengagement between said lip and said finger and wherein the force generated by said spring means is sufficient to cause the automatic engagement of said lock means even when there is no suction present at the orifice.

2. A fitting as recited in claim 1 further including a lug formed on said cap and located such that when said cap is in the open position, the lug will engage the vacuum hose to enhance the connection between the hose and the fitting.

3. A fitting as recited in claim 2 wherein the free end of said lug is provided with an arcuate configuration to enhance the engagement with the vacuum hose.

4. A fitting as recited in claim 1 further including a screw, threadably received in said body member for engaging the pool wall to prevent rotation of the fitting.

5. A fitting as recited in claim 1 wherein said body member includes a threaded cylindrical section to facilitate mounting to the vacuum orifice.

* * * * *